United States Patent [19]

Mori et al.

[11] Patent Number: 4,968,924
[45] Date of Patent: Nov. 6, 1990

[54] DRIVING APPARATUS FOR RUNNING UNIT OF ROBOT

[75] Inventors: Hiroaki Mori, Kobe; Kazuhiko Onoue, Nishinomiya, both of Japan

[73] Assignee: Kawasaki Jukogyo Kabushiki Kaisha, Kobe, Japan

[21] Appl. No.: 490,726

[22] Filed: Mar. 8, 1990

[30] Foreign Application Priority Data

Mar. 10, 1989 [JP] Japan .................................. 64-58805

[51] Int. Cl.$^5$ ............................................. G05B 19/22
[52] U.S. Cl. .................................. 318/568.1; 318/567; 318/687; 318/571; 414/751; 901/9; 901/20; 364/148
[58] Field of Search ............................... 318/560–640; 364/513, 148; 901/3, 9, 12, 18, 19, 20, 23; 414/751, 730

[56] References Cited

U.S. PATENT DOCUMENTS

| | | | |
|---|---|---|---|
| 4,087,731 | 5/1978 | Rhoades | 318/571 X |
| 4,215,299 | 7/1980 | Edwin et al. | 318/574 |
| 4,437,045 | 3/1984 | Mitsuoka | 901/9 X |
| 4,534,006 | 8/1985 | Minucciani et al. | 318/568.13 X |
| 4,639,652 | 1/1987 | Takahashi et al. | 318/568.22 |
| 4,714,400 | 12/1987 | Barnett et al. | 318/625 X |
| 4,799,981 | 1/1989 | Stone et al. | 318/567 X |
| 4,810,941 | 3/1989 | Ohishi et al. | 318/592 X |

*Primary Examiner*—William M. Shoop, Jr.
*Assistant Examiner*—Paul Ip
*Attorney, Agent, or Firm*—Wenderoth, Lind & Ponack

[57] ABSTRACT

A driving apparatus for smoothly driving a running unit of a robot, including a movable table movably supported by first and second gear mechanisms driven by independent first and second motors engaging with respective two parallel racks to carry a robot body. This apparatus includes a position command unit for delivering a first position command value to the first motor; a constant value generation unit for generating a constant value indicative of a difference between output values from first and second encoders provided in association with the first and second motors when the movable table is positioned perpendicular to the parallel racks; and a correction unit for determining a first deviation between the first position command value and an output value from the first encoder and determining a second deviation between a second command value obtained by adding the constant value to the first position command value and an output value from the second encoder to determine a third deviation between these first and second deviations to correct the first and second deviation signals on the basis of the third deviation to thereby output corrected position command values for the first and second motors, respectively.

3 Claims, 4 Drawing Sheets

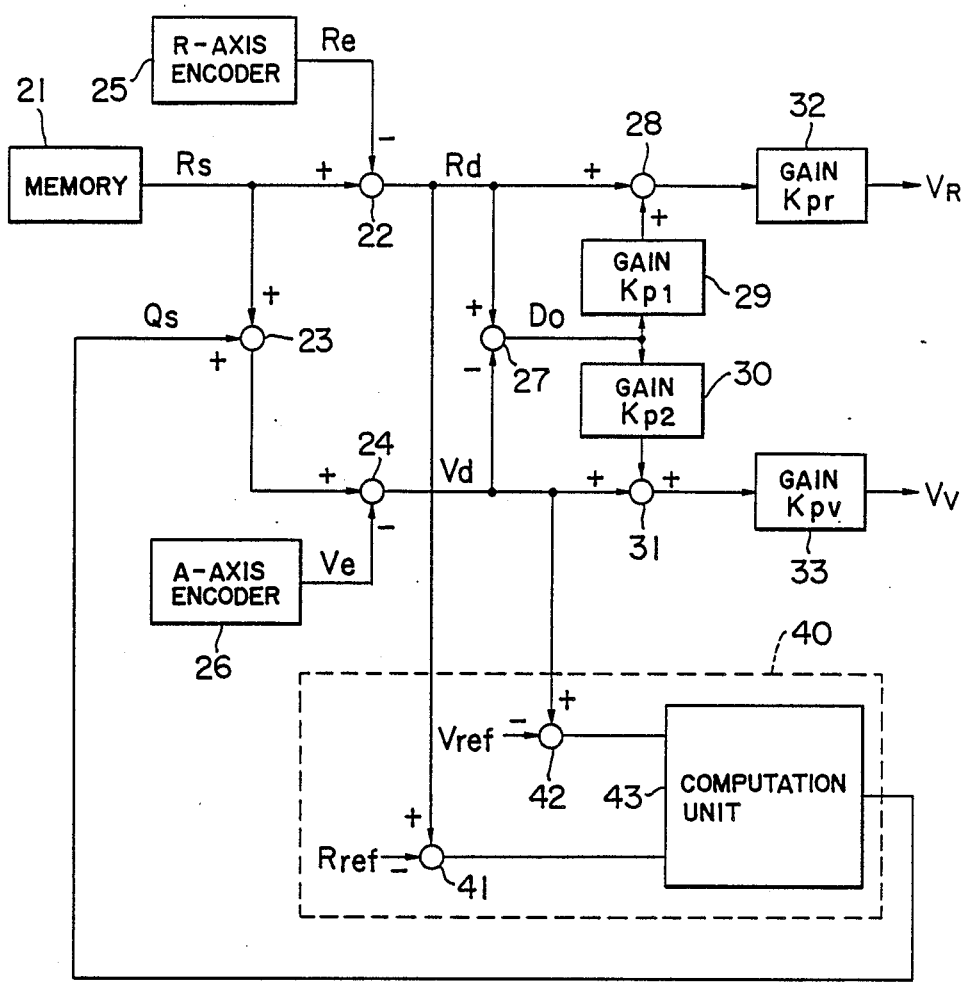
F I G. 4

4,968,924

DRIVING APPARATUS FOR RUNNING UNIT OF ROBOT

BACKGROUND OF THE INVENTION

This invention relates to a driving apparatus for a running unit of a robot, and more particularly, to a driving apparatus suitable for a large robot running at a high speed.

For the purpose of carrying out various kinds of work such as spot welding, handling, and the like using general-use robots so as to exhibit a performance equal to that of conventional large industrial robots, a gantry robot constructed so that a robot is attached to a large frame body through a running device or unit is used in order to move the robot body to a required position (see Japanese patent application Laid Open No. 171894/87).

An example of this running unit is shown in FIG. 1.

As best shown in this figure, a set of parallel racks 53 and 54 are provided on parallel two side frames 51 and 52 of the frame body. Furthermore, a table for supporting the robot body is movably mounted on these racks. Namely, a set of gears 55 and 56 engaging with the respective racks 53 and 54 and coupled by a transmission shaft 57 are provided. Furthermore, this transmission shaft 57 is rotationally driven by a motor 58, a reduction gear 59, a sprocket 60, a timing belt 61, and a sprocket 62. Thus, the robot can be moved on the racks by rotation of the motor.

In such a running unit, since robots have tended to become large in size in recent years, the movement span of the robot is 3 to 5 m, and a required speed is 1 m/s or more. For this reason, the length of the transmission shaft is gradually elongated. In such a case, the influence of torsional error by torsional rigidity of the transmission shaft can no longer be ignored. Namely, a quantity of torsion at the both ends of the transmission shaft varies depending upon the position of the robot body as the load on the transmission shaft. As a result, meshing or engagement of the gears becomes poor, so smooth movement is prevented, giving rise to problems in the running characteristics. Accordingly, it becomes difficult to realize a running device having a long span and moving at a high speed.

Furthermore, a large capacity motor is required in order to carry out a high speed movement. However, such a motor is heavy in weight, and proves an obstacle to the high speed movement.

For this reason, there is proposed a running unit for a robot constructed so that running mechanisms driven by motors are respectively provided for every two racks to independently control them, thereby eliminating the influence of torsion without using a long transmission shaft.

In such a running device, the influence of torsion of the transmission shaft is eliaminted, but there still occur instances where the meshing of gears is not satisfactory because the two motors are controlled in an unrelated manner. In the extreme case, there is the possibility that the axial directions of two toothed wheels greatly deviate from the direction perpendicular to the rack direction, so running is stopped because of biting of the toothed wheels.

SUMMARY OF THE INVENTION

Accordingly, an object of this invention is to provide a running device for a robot, capable of moving a supporting table for the robot having a long span at a high speed.

According to the present invention, there is disclosed a driving apparatus for smoothly driving a running unit of a robot, including a movable table movably supported by first and second toothed wheel mechanisms driven by independent first and second motors engaging with respective two parallel racks to carry a robot body, the apparatus comprising position command means for delivering a first position command value to the first motor; constant value generation means for generating a constant value indicative of a difference between output values from first and second encoders provided in association with the first and second motors when the movable table is positioned perpendicular to the parallel racks; and correction means for determining a first deviation between the first position command value and an output value from the first encoder and determining a second deviation between a second command value obtained by adding the constant value to the first position command value and an output value from the second encoder to determine a third deviation between these first and second deviations to correct the first and second deviation signals on the basis of the third deviation to thereby output corrected position command values for the first and second motors, respectively.

In accordance with this invention, two servomotors for driving gears meshing with two racks are attached on the both sides of the movable table, respectively. On the premise that the movable table is positioned perpendicularly to the racks, a command value is given to determine a quantity of feedback with respect to the command value in dependency upon a deviation between deviations between the actual values from encoders on both sides and the command value. Thus, since the inclination of the shaft can be minimized, smooth high speed movement can be carried out without undergoing the influence of the torsional rigidity of the drive shaft, and without undergoing the influence based on positions of the load.

Furthermore, there is provided a command value determination means for determining a command value so that a deviation between a value from each encoder and a command value becomes minimum, thereby making it possible to determine a command value after the running device is assembled and without carrying out a complicated or troublesome measurement.

Preferred embodiments of this invention will be described with reference to the attached drawings.

BRIEF DESCRIPTION OF THE DRAWINGS

In the attached drawings:

FIG. 4 is a block diagram showing the arrangement of another embodiment of a control circuit used in the robot running device according to this invention.

DESCRIPTION OF THE PREFERRED EMBODIMENT

Figure 2:
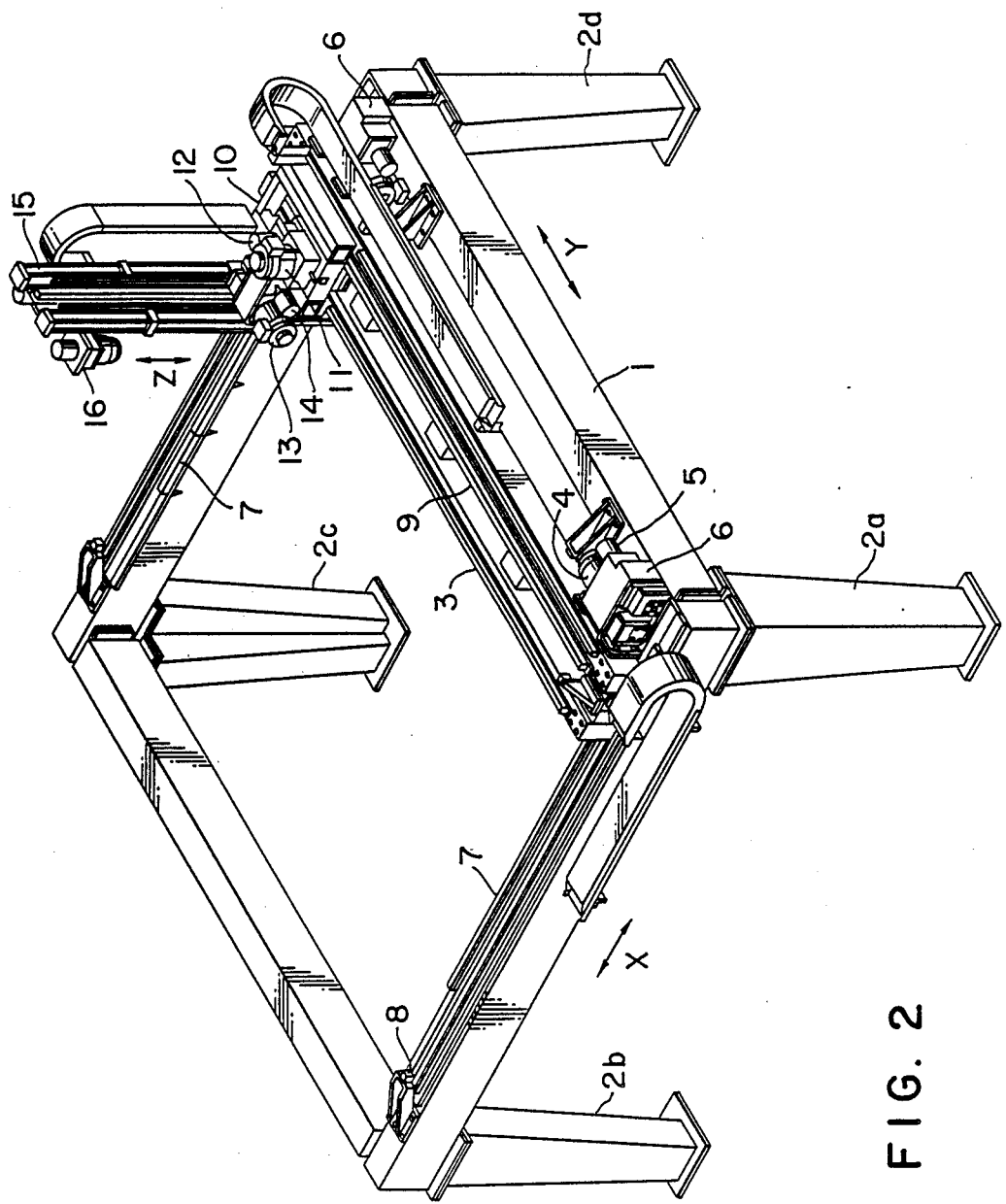
FIG. 2 ia a perspective view showing the appearance of a gantry robot running device to which this invention is applied.

FIG. 2 is a perspective view showing the outline of a gantry robot to which this invention is applied.

Two racks 7, 7 are arranged on the side in an X-direction of a base frame 1 supported by four legs 2a to 2d. Gear units 6, 6 engaging with respective racks 7, 7 are provided. Furthermore, a movable table 3 arranged in a Y-direction is provided. At the end portions of the racks 7, 7, stoppers 8 are provided so that the movable table 3 does not overrun a predetermined limit, respectively. On the upper surface of the movable table 3, a single rack 9 is provided. A second movable table 10 driven by a motor 11 and running in the Y-axis is provided on the rack 9. Furthermore, a robot arm 15 driven by a motor 13 and upwardly and downwardly moving in a Z-direction is provided at the end portion of the movable table 10. A motor attached at the upper portion of the arm 15 serves to carry out the operation of rotation, etc. of the arm front end. In FIG. 2, reference numerals 5, 12 and 14 denote rotary encoders, respectively. These encoders serve to detect a rotation of each related gear to generate a pulse corresponding to a quantity of movement.

Figure 1:
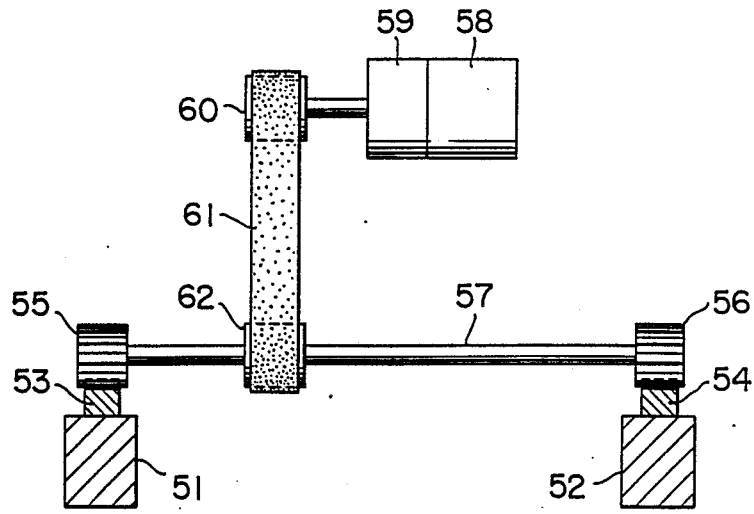
FIG. 1 is an explanatory view showing an example of a conventional running device for a robot.
Figure 3:
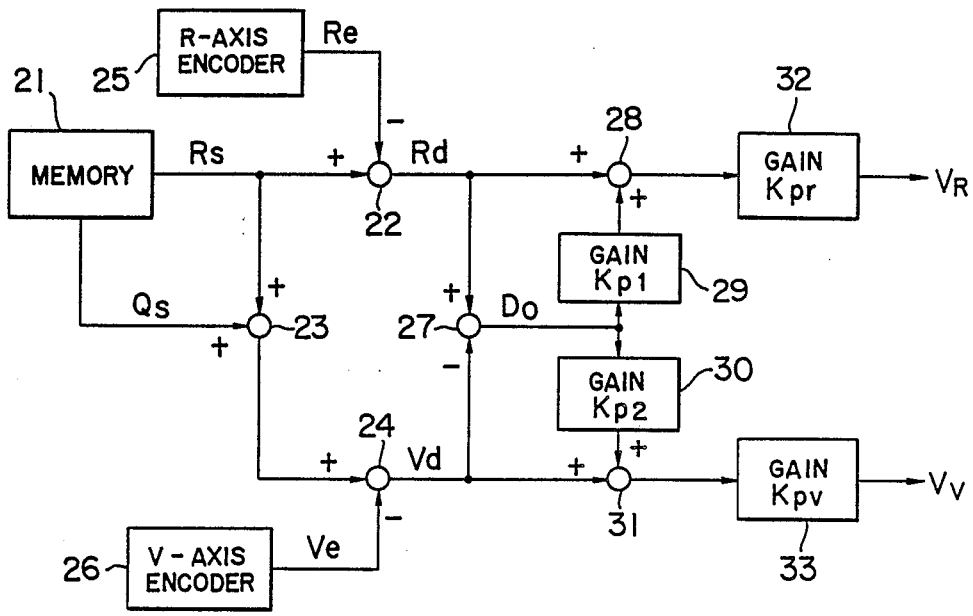
FIG. 3, is a block diagram showing the arrangement of an embodiment of a control circuit used in a robot running device according to this invention.

FIG. 3 is a circuit diagram showing the control system of the running unit according to this invention.

Here, shafts of two drive gears respectively meshing with two racks provided in the X-direction are assumed to be the R-axis and V-axis, respectively.

A command value Rs with respect to the R-axis taken out from a memory 21 is delivered to a subtracter 22. An output Re from a R-axis encoder 25 is subtracted from the command value Rs, resulting in a deviation signal Rd. Furthermore, at an adder 23, the command value Rs with respect to the R-axis is added to a command value Qs taken out from the memory 21. At a subtracter 24, an output Ve from a V-axis encoder 26 is subtracted from the added value, resulting in a deviation signal Vd. This command value Rs is a position command value given every timing having a predetermined interval in order to allow the robot body to reach a given position. When a deviation from an actual encoder value exists, it is indicated that the robot body does not reach a target value. Furthermore, a command value Qs is a value indicative of a difference between a V-axis encoder value and a R-axis encoder value in the case where the movable table 3 is positioned perpendicular to the rack direction. This command value Qs is a constant.

At a subtracter 27, a deviation signal Do between deviation signals Rd and Vd is determined. This deviation signal Do is multiplied by the value of a gain Kpl at a gain setter 29. The multiplied value thus obtained is added to the deviation signal Rd at an adder 28. Then, the added value thus obtained is multiplied by a gain Kpr at a gain setter 32. Thus, a command value $V_R$ corrected with respect to the R-axis is finally outputted.

Similarly, the deviation signal Do is multiplied by the value of a gain Kp2 at a gain setter 30. The multiplied value thus obtained is added to the deviation signal Vd at an adder 31. Then, the added value thus obtained is multiplied by a gain Kpv at a gain setter 33. Thus, a command value Vv corrected with respect to the V-axis is finally outputted.

Accordingly, when there occurs a deviation between an encoder value and an actual encoder value, a command value is corrected so as to maintain perpendicularity of the movable table in dependency upon that deviation. Thus, there is no possibility that the engagement of gears might become extraordinary in dependency upon the position in the Y-axis of the robot body as the load.

In the embodiment of FIG. 3, the command value Qs is dealt with as a known constant after perpendicularity is precisely established while carrying out a complicated measurement after the running device is assembled. However, where the running device is initially assembled, the perpendicularity of the Y-axis direction and the X-axis direction of the movable table 3 is unknown. For this reason, it is desirable to automatically set the value of Qs. The arrangement to realize this is shown in FIG. 4.

FIG. 4 is an improved arrangement of FIG. 3. The same components as those in FIG. 3 are designated by the same reference numerals, respectively, and their explanation will be omitted. The arrangement of FIG. 4 differs from the arrangement of FIG. 3 in that there is provided a command value setting circuit 40 for automatically setting a command value Qs. This command value setting circuit 40 comprises a subtracter 41 for determining a deviation between a deviation signal Rd and a reference value Rref, a subtracter 42 for determining a deviation between a deviation signal Vd and a reference value Vref, and a computation unit 43 for changing the value of Qs on the basis of the relationship between outputs from these subtracters 41 and 42.

Figure 5:
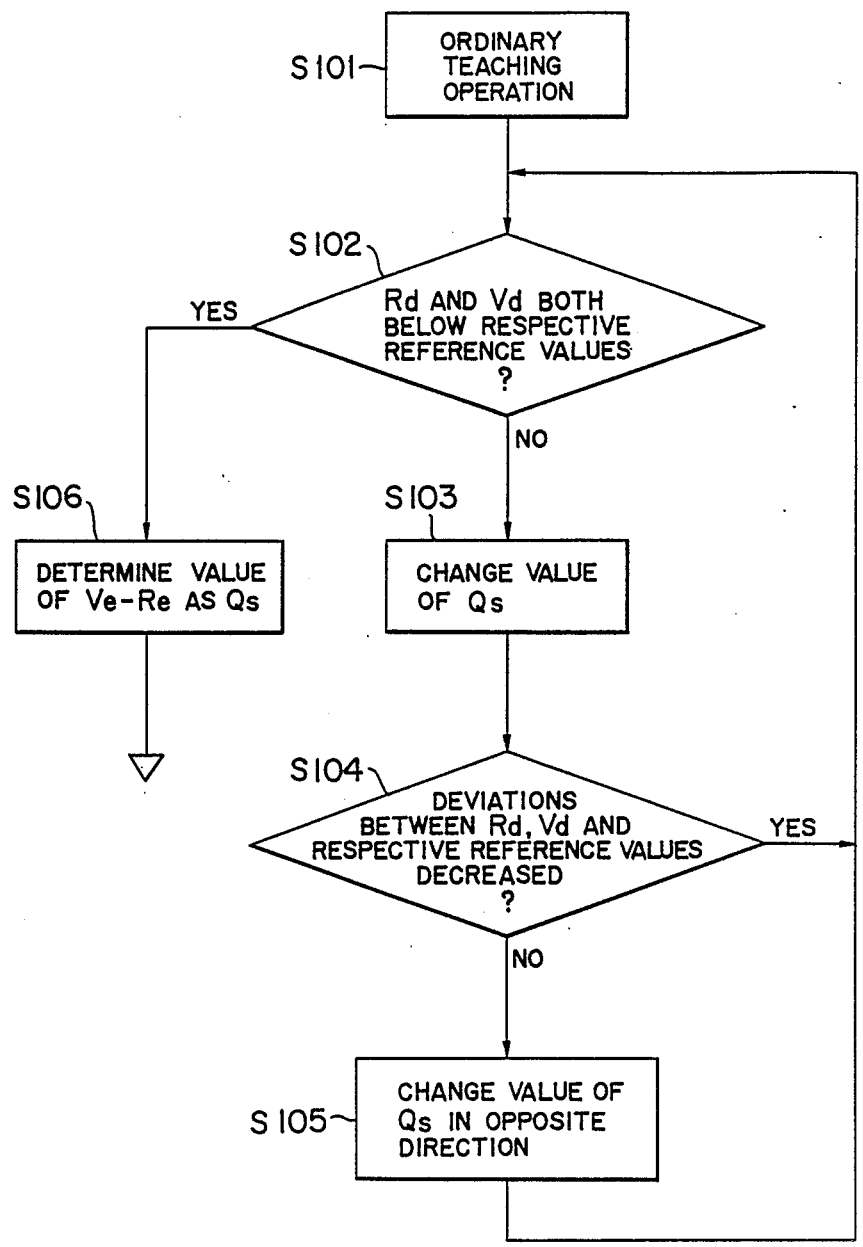
FIG. 5 is a flowchart showing the operation of a computation unit in FIG. 4.

FIG. 5 is a flowchart showing the operation of the computation unit 43.

After the device has been assembled, ordinary teaching data is first given to drive the gear (step S101) to determine values of Rd, Vd at this time to compare them with reference values Rref and Vref, respectively. When deviations Rd and Vd are both below the reference values Rref and Vref, the value of (Ve−Vr) at that time is determined as Qs.

On the other hand, when deviations Rd and Vd are not both below reference values Rref and Vref, the value of (Ve−Vr) is changed at a fixed rate to assume the changed value as the value of Qs (step S103). Then, the value of Qs is used to drive the gear to thereby check whether or not deviations Rd and Vd are both decreased (step S104). As a result, when it is judged that they have decreased, the operation returns to the beginning of the step S102. When it is judged as a result of this step that those deviations are both below the reference values Rref and Vref, respectively, the value of Qs is determined to complete the operation (step S106). In contrast, when it is judged that deviations Rd and Vd are increased, the value of Qs is changed to a value on the side opposite to the above (step S105) to return to the entrance of the step S102 to continue the operation in a manner similar to the above until deviations Rd and Vd fall below the reference values, respectively.

Values of Qs determined in this way are stored in the memory. Thus, a control is carried out using an arbitrary one of these values as a command value.

As stated above, by the provision of the computation unit 43, determination of command values after the robot running unit has been assembled can be made without carrying out a measurement which is complicated and time-consuming.

What is claimed is:

1. A driving apparatus for a running unit of a robot including two parallel racks, first and second gear mechanisms driven by independent first and second motors engaging with these racks, respectively, and a movable table movably supported by said gear mechanisms to carry a robot body, said driving apparatus comprising:
position command means for delivering a first position command value to said first motor;
constant value generation means for generating a constant value indicative of a difference between output values from first and second encoders provided in association with said first and second motors when said movable table is positioned perpendicular to said parallel racks; and
correction means for determining a first deviation between said first position command value and an output value from said first encoder and determining a second deviation between a second command value obtained by adding said constant value to said first position command value and an output value from said second encoder to determine a third deviation between said first and second deviations to correct said first and second deviation signals on the basis of said third deviation to thereby output corrected position command values for said first and second motors, respectively.

2. A driving apparatus for a running unit of a robot as set forth in claim 1, wherein said constant value generation means is comprised of a memory.

3. A driving apparatus for a running unit of a robot as set forth in claim 1, wherein said constant value generation means includes modification means for comparing said first and second deviations with predetermined reference values, respectively, to thus change a constant value to be outputted so that said first and second deviations fall below said respective reference values when said first and second deviations are above said respective reference values.

* * * * *